Sept. 25, 1934.   A. S. MUSSELMAN   1,974,992
TEMPERATURE CONTROL
Filed June 11, 1931
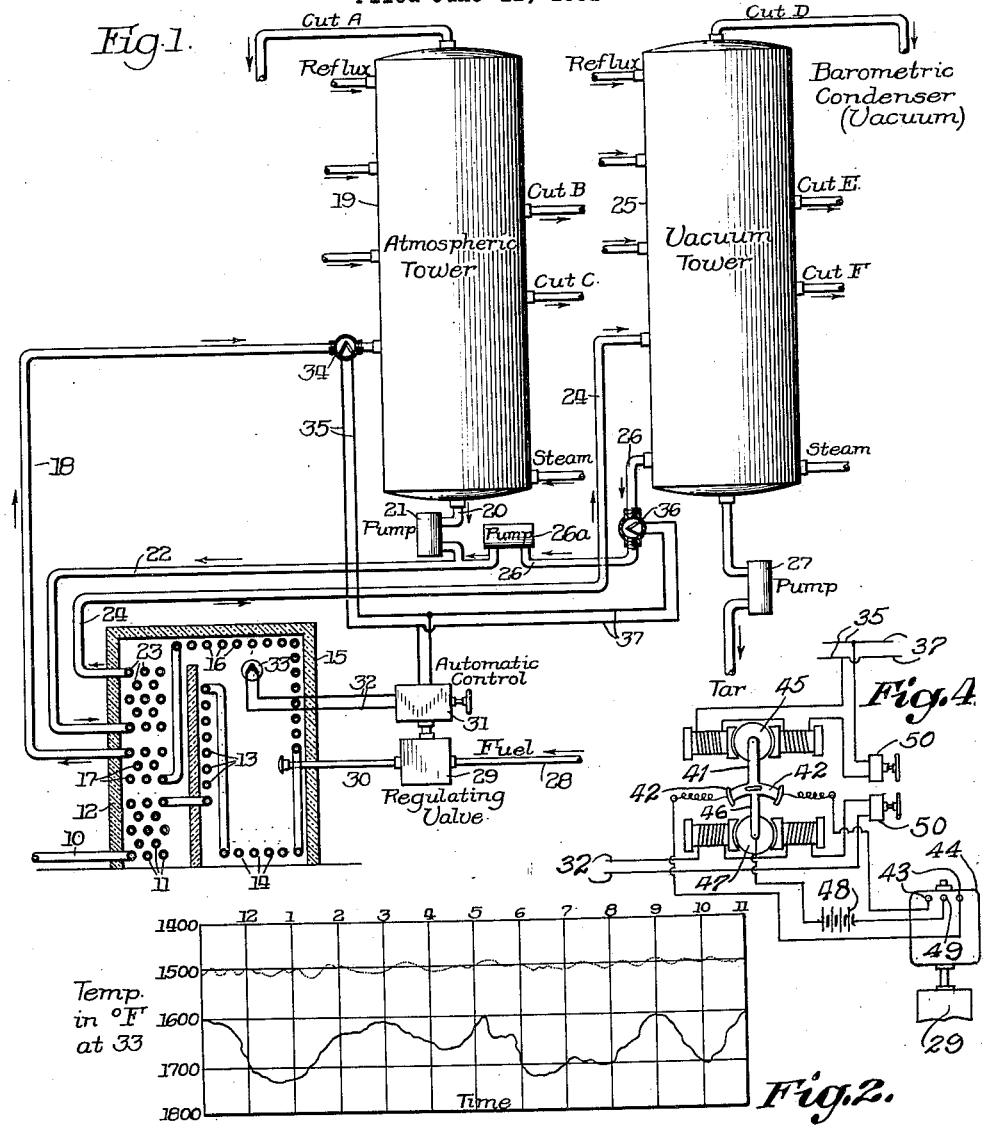
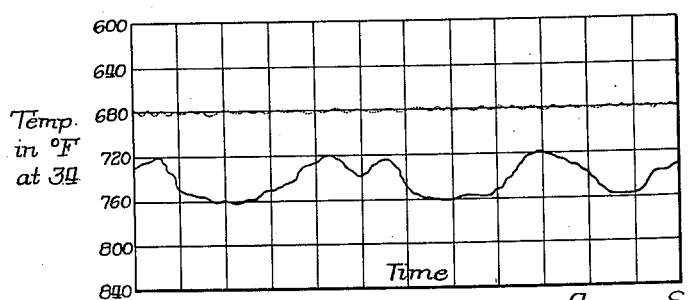

Patented Sept. 25, 1934

1,974,992

UNITED STATES PATENT OFFICE 1,974,992

TEMPERATURE CONTROL

Amos S. Musselman, Hammond, Ind., assignor to Standard Oil Company, Chicago, Ill., a corporation of Indiana Application June 11, 1931, Serial No. 543,639

7 Claims. (Cl. 196—132)

This invention relates to a temperature control system and it pertains more particularly to a method and means of controlling the temperature in various parts of a petroleum distillation unit.

In the distillation of petroleum the oil is heated in a pipe still and fractionated in one or more towers which are provided with suitable reflux means, vapor liquid contact means and stripping means. It is sometimes necessary or desirable to return a portion of the liquid from a fractionating tower or towers to a section of the pipe still for further heating, thus avoiding the installation cost and operating expense of a plurality of pipe stills. When different coils or banks of coils in a pipe still are used for heating oils from different parts of the system the problem of regulating the furnace temperature becomes complicated. If the temperature at one point of the fractionating system is maintained at a constant value, it will be found that the temperature in the other parts of the system varies throughout a wide range.

The object of this invention is to provide a means for maintaining constant temperatures at a plurality of points in the fractionation system, employing a single furnace for heating a purality of oil streams. A further object is to provide an improved electrical circuit between a fuel control and different parts of a distillation system whereby uniform temperatures may be maintained in the various parts of the fractionation system.

Briefly, my distillation unit comprises a pipe still, an atmospheric tower and a vacuum tower, and the residue from the atmospheric tower together with a portion of the vacuum tower residue is circulated through coils in the pipe still and introduced into the vacuum tower. In this system a constant furnace temperature does not insure a constant temperatures in the respective towers because of unavoidable variations in the amount and character of the feed stock, and unavoidable fluctuations in the rectifying system. Furthermore, if the temperature is maintained constant in one tower, both the furnace temperature and the temperature of the other tower will fluctuate throughout a relatively wide range. I have discovered that if thermocouples in a plurality of the vital points in the system are interconnected in a certain manner, they may effectively control the range of furnace temperatures.

To avoid confusion I will refer to the ordinary furnace temperature control as "furnace control". This control is operated by a thermocouple near the roof tubes of the furnace and it automatically admits more fuel when the temperature falls below a given limit and less fuel if the temperature rises above another limit, the "limits" determining a certain "mean" temperature. The thermocouples in the various parts of the fractionating system control the "mean" temperature. My invention relates to the interconnection and co-operation between thermocouples in the fractionation system in regulating the mean temperature which is to be maintained by the furnace control.

The invention will be more clearly understood from the following description of a preferred embodiment which is illustrated in the accompanying drawing wherein—

Figure 1 is a diagrammatic elevation of my improved apparatus,

Figure 2 is a chart showing the furnace temperatures before and after the application of my invention, Figure 3 is a chart showing the temperature fluctuation at a given point in the fractionating system before and after the use of my invention, and Figure 4 is a schematic view of the diluent control mechanism.

The oil to be distilled, which may, for example, be a crude Mid-Continent petroleum oil, is introduced by pipe 10 into the lower convection coils 11 of pipe still 12. The oil is then passed through radiant tubes 13, floor tubes 14, wall tubes 15, roof tubes 16 and convection tubes 17 to pipe 18 which discharges the heated oil at about 680° F. into a fractionating tower 19, which is preferably at atmospheric pressure.

This tower is preferably provided with a plurality of bubble plates or other suitable fractionation equipment, with steam stripping means at the base, with reflux coils at the top, with means for introducing reflux liquid at various levels, and with means for withdrawing various cuts. These features per se form no part of my present invention and they will therefore not be described in detail.

The residuum from the atmospheric tower is discharged through pipe 20, pump 21 and pipe 22 to convection coils 23 in the top convection portion of the furnace. The oil is therein heated to a temperature of about 770–780° at which temperature it is introduced through pipe 24 into vacuum tower 25, which is preferably maintained at a pressure of about 150 mm. This tower is likewise provided with suitable vapor liquid contact means, reflux means, and stripping means.

A portion of the non-vaporized liquid is conducted from a point near the base of the vacuum tower by means of pipe 26 and pump 26A to pipe 22, coils 23, etc. and is reintroduced into the vacuum tower. Tar is withdrawn from the base of the vacuum tower through a suitable pump 27, and various cuts are withdrawn from the top and sides of the tower through stripping means and pumps, or barometric condensers.

Fuel is supplied to the furnace through pipe 28, fuel valve 29 and nozzle 30. Valve 29 is operated by an electric motor, which motor is controlled by a thermostat in control box 31.

The valve control mechanism, as shown in Figure 4, may include a rocker arm 41 having spaced contacts 42 connected with two of the leads 43 of a three lead reversible valve motor 44, an electromagnetic armature 45 responsive to the resultant action of the thermo-couples 34 and 36 and a swing contact arm 46 carried by an armature 47, similar to the armature 45, responsive to the thermocouples 33. The contact arm 46 may be connected, in series with a current source 48, to the remaining lead 49 of the motor 44. If desired, potentiometers 50 may be included in the circuits 37 and 32 respectively to facilitate the adjustment of the positions of the armatures 45 and 47.

The thermostat is connected by wires 32 to a thermocouple 33 in the upper part of the combustion chamber of the furnace. If the temperature in the furnace increases a given amount above a predetermined mean, the device automatically closes the fuel valve, and if the temperature falls a given amount below the predetermined mean the device automatically opens the regulating valve. Devices of this type are well known, and since they form no part of my present invention they will not be described in detail.

The device hereinabove described serves to maintain a constant mean temperature;— whether this mean is high or low depends on another thermo-control system which acts in effect to "set" the thermostat. A thermocouple 34 is connected by wires 35 to the thermostat control box 31. This thermocouple is preferably placed in the fractionating system at the point where pipe 18 discharges into atmospheric tower 19, since this temperature is indicative of the temperature conditions inside the tower. A thermocouple 36 is placed in the fractionation system at the point where recycled residuum in pipe 26 leaves vacuum tower 25. (This thermocouple may be inserted where pipe 24 enters the vacuum tower, but I have found it desirable to place it where the recycle stock leaves the tower). I prefer to connect thermocouple 36 by wires 37 in parallel with thermocouple 34, so that the effect on the thermo-control (which sets the thermostat) will be the average of the effects which would be produced by the separate thermocouples. For this arrangement the connecting wires 35 should have substantially the same resistance as connecting wires 37, that is, the potential drop through the lines 35 and 37 should be substantially the same so that each thermocouple can exert an equal influence upon the automatic control. Also a rheostat may be inserted in line 35 and line 37 so that the influence from the thermocouples 34 and 36 may be varied according to the influence desired from each of the thermocouples. For example, if the quantity of fluid passing the point 34 is several times larger than the quantity of fluid passing the point 36 it may be desirable to retard the influence of the thermocouple at 36 and thereby enable the thermocouple at 34 to exert a greater influence upon automatic control than the thermocouple at 36. This parallel arrangement is particularly useful for thermocontrols designed to be actuated by a single thermocouple. The thermocouples 34 and 36 may be connected in series, but when this is done the thermo-control will have to be designed for about twice the normal voltage. Also the series hook-up is not as sensitive as the parallel hook-up, and consequently the series hook-up does not actuate the automatic control as quickly as the parallel hook-up.

In effect, the parallel or series connection between thermocouples 34 and 36 makes it possible to automatically set the thermostat in accordance with the average temperature requirement. If one of these thermocouples is disconnected, that balance is upset and the temperature in that part of the system will fluctuate throughout a relatively wide range. For example, if thermocouple number 34 is disconnected and the mean temperature is controlled only by thermocouple number 36, the temperature in the furnace will vary, as shown in the solid line in Figure 2 and the temperature of oil entering tower 19 through pipe 18 will vary as shown in the solid line in Figure 3. When the thermocouple 34 is connected in the electrical circuit with thermocouple 36, the furnace temperatures and the temperatures of oil entering tower 19 will be as shown by the dotted lines in Figures 2 and 3.

The same phenomena would occur if thermocouple 36 were disconnected. It is essential that the separate parts of the fractionation system or in this case that the separate towers be provided with separate thermocouples and that these thermocouples be connected in an electric circuit with a control so that said control will be operated by the average needs of the system instead of by the temporary needs of one particular point in the system.

While I have described in detail a particular embodiment of my invention it is understood that I do not limit myself to the details therein set forth, except as defined in the following claims.

I claim:

1. In an apparatus of the class described, a pipe still having a furnace and a plurality of heater conduits, a fractionating system, means for passing oil through one of said conduits to a part of said fractionating system, means for returning part of the oil to another heater conduit and for introducing the reheated oil to another part of said fractionating system, thermocouples in said parts of the fractionating system, a thermocouple in the furnace of said pipe still, means whereby the furnace thermocouple maintains a predetermined mean temperature, and means comprising an electrical circuit including the other thermocouples for automatically setting said furnace temperature control means.

2. In an apparatus of the class described, a pipe still, a plurality of fractionating towers, thermocouples for indicating temperature conditions in each of said towers, an electrical circuit connecting said thermocouples whereby one modifies the action of the other, means for maintaining the temperature in said pipe still at a predetermined mean, and means controlled by said circuit for automatically adjusting said last named means in accordance with the composite action of said thermocouples.

3. In a system wherein oil is heated in a pipe still and fractionated in an atmospheric tower, the residue is heated in separate coils of the same pipe still and fractionated in a vacuum tower, and recycle stock from said vacuum tower is mixed with said residue, a furnace thermocouple, a thermostat controlled thereby for maintaining a mean furnace temperature, a thermocouple in the oil inlet to the atmospheric tower, a thermocouple in the recycle outlet of the vacuum tower, and means for connecting said last named thermocouples whereby each modifies the effect of the other to automatically set the thermostat.

4. In an apparatus of the class described, a pipe still, a fractionating system, means, including thermocouples at separated points in said system and connected in parallel, for maintaining a mean furnace temperature in accordance with temperatures at said separate points in said fractionating system.

5. In an oil heating process where the oil is heated in a pipe still, removed therefrom to a treating system, and part of said oil is recycled to the pipe still and then returned to said treating system, apparatus for controlling the heating of the oil to a substantially constant temperature which comprises, a plurality of thermocouples in said treating system which will respond to the temperature conditions of the oil recycled to the pipe still, said plurality of thermocouples establishing a mean temperature, and a thermocouple placed in said pipe still to regulate the supply of fuel to said pipe still when the temperature within the pipe still varies from the mean temperature.

6. In a process for heating oil with a pipe still, the method of anticipating the temperature conditions needed in said pipe still to maintain a substantially constant temperature within said pipe still, which comprises, maintaining a temperature in the pipe still in response to a mean temperature established by a plurality of thermocouples placed in heat exchange relation with hot oil to be circulated through the pipe still.

7. In combination, apparatus for heat treating fluids, a circulatory system for conducting fluid to and from said apparatus, an adjustable thermo-responsive device for controlling the heat treating temperature in said apparatus, and means including an electrical circuit incorporating a plurality of thermocouples distributed throughout said circulatory system in heat exchange relation with the fluid therein for automatically adjusting said heat control device in accordance with the composite action of said thermocouples, said thermocouples being so connected in said circuit as to cause each to modify the other and to collectively act upon the circuit.

AMOS S. MUSSELMAN.